United States Patent
Pong

(10) Patent No.: US 9,085,382 B2
(45) Date of Patent: *Jul. 21, 2015

(54) METHOD AND APPARATUS FOR PRODUCING CUT TO LENGTH BARS IN A STEEL MILL

(75) Inventor: David Teng Pong, Hong Kong (CN)

(73) Assignee: David Teng Pong, Hong Kong (HK)

( * ) Notice: Subject to any disclaimer, the term of this patent is extended or adjusted under 35 U.S.C. 154(b) by 0 days.

This patent is subject to a terminal disclaimer.

(21) Appl. No.: 13/530,770

(22) Filed: Jun. 22, 2012

(65) Prior Publication Data

US 2013/0086870 A1 Apr. 11, 2013

(30) Foreign Application Priority Data

Oct. 7, 2011 (GB) .................................. 1117354.9

(51) Int. Cl.
B65B 27/10 (2006.01)
B23D 36/00 (2006.01)
(Continued)

(52) U.S. Cl.
CPC ............ *B65B 27/10* (2013.01); *B23D 36/0016* (2013.01); *B23D 36/0033* (2013.01); *B65B 65/006* (2013.01); *B21B 2015/0014* (2013.01)

(58) Field of Classification Search
CPC ........... E04C 5/0627; E04C 5/00; E04C 3/00; B23P 13/04; B23B 27/06; B23F 11/00; B23K 26/02; B21B 43/08; B21B 1/16; B21B 1/163; B21B 1/18; B21B 1/00; B65B 13/04; B65G 47/53
USPC ........... 72/129, 130, 131, 132, 203, 237, 238, 72/239, 249, 412; 29/412, 416, 417, 64, 29/527.7, 527.6, 34 R; 83/39, 29, 37, 86, 83/102, 105, 170, 370; 100/2, 4, 7; 53/26, 53/339, 399, 443, 444, 447, 147, 148, 167, 53/582, 588
See application file for complete search history.

(56) References Cited

U.S. PATENT DOCUMENTS 2,631,526 A * 3/1953 Mathey ............................ 100/4
3,127,829 A * 4/1964 Rossi ................................ 100/4
3,135,076 A * 6/1964 Hill ................................ 53/399
(Continued)

FOREIGN PATENT DOCUMENTS

EP 0445311 9/1991
EP 1598123 11/2005
(Continued)

OTHER PUBLICATIONS

Search Report for GB1117354.9 dated Oct. 20, 2011.
(Continued)

*Primary Examiner* — Shelley Self
*Assistant Examiner* — Peter Iannuzzi
(74) *Attorney, Agent, or Firm* — Andrus Intellectual Property Law, LLP

(57) ABSTRACT

A method of producing steel bars that are cut to length in response to a customer order. The method includes producing a continuous length of steel bar from a rolling mill, cutting said continuous length of steel bar into lengths equal to the length of the bar of the customer order while maintaining the production of the continuous length of steel bar produced by the rolling mill, and bundling bars of the length of the customer order for discharge from the mill using one of two bundling stations arranged to receive and bundle cut bars.

12 Claims, 2 Drawing Sheets

(51) Int. Cl.
*B65B 65/00* (2006.01)
*B21B 15/00* (2006.01)

(56) References Cited

U.S. PATENT DOCUMENTS

| | | | | |
|---|---|---|---|---|
| 3,221,641 | A * | 12/1965 | Adams et al. | 53/149 |
| 3,466,958 | A * | 9/1969 | Munson | 83/76.4 |
| 3,621,696 | A * | 11/1971 | Norlindh | 72/201 |
| 3,871,288 | A * | 3/1975 | White | 100/2 |
| 3,880,070 | A * | 4/1975 | Kaplan | 100/7 |
| 4,307,594 | A * | 12/1981 | Steinbock | 72/201 |
| 4,339,861 | A * | 7/1982 | Shiraishi et al. | 29/416 |
| 4,778,044 | A * | 10/1988 | Kondo | 198/464.2 |
| 4,905,157 | A * | 2/1990 | Yamamoto | 700/167 |
| 5,156,033 | A | 10/1992 | Matsuo et al. | |
| 5,191,818 | A * | 3/1993 | Mantovan et al. | 83/27 |
| 5,994,665 | A * | 11/1999 | Nishibayashi et al. | 219/121.64 |
| 6,402,010 | B1 * | 6/2002 | Virginio et al. | 228/158 |
| 6,698,266 | B2 * | 3/2004 | Brower | 72/203 |
| 6,892,104 | B2 * | 5/2005 | Patil et al. | 700/95 |
| 8,046,901 | B2 * | 11/2011 | Bordignon et al. | 29/527.6 |
| 8,215,145 | B2 * | 7/2012 | Pong | 72/129 |
| 2008/0196236 | A1 | 8/2008 | Giuseppe et al. | |
| 2011/0036137 | A1 | 2/2011 | Pong | |

FOREIGN PATENT DOCUMENTS

| | | |
|---|---|---|
| GB | 2488386 | 1/2013 |
| JP | 55-126326 | 9/1980 |
| JP | 62-083902 | 4/1987 |
| JP | 62-062204 | 3/1989 |
| JP | 64-062204 | 3/1989 |
| JP | 4-97007 | 8/1992 |
| SU | 1338904 | 4/1986 |
| SU | 1701442 | 12/1991 |

OTHER PUBLICATIONS

Notice of Reasons for Rejection for Japanese Application No. 2012-107758 dated Jul. 10, 2012.

Ukrainian Examination Report for Application No. 19482/3A/12 dated Aug. 17, 2012.

Examination Report (translation) for KR10-2012-54467 issued Nov. 6, 2012.

Notice of Acceptance for Australian Patent Application No. 2012202199 dated Dec. 4, 2012.

English Translation of JP64-62204, published Dec. 4, 1998.

English Translation of JP62-083902, published Apr. 17, 1987.

* cited by examiner

METHOD AND APPARATUS FOR PRODUCING CUT TO LENGTH BARS IN A STEEL MILL

CROSS-REFERENCE TO RELATED APPLICATIONS

This application claims priority to GB 1117354.9, filed Oct. 7, 2011, the content of which is incorporated herein by reference in its entirety.

FIELD OF THE INVENTION

The invention relates to methods and apparatus for producing bundles of steel bars which are cut to length and particularly in a continuous operation.

More particularly, the invention relates to producing such bundles which are customer-ordered and are of specific length.

Steel bars, whether they are for concrete reinforcement or specialty steel, all have a fundamental flaw in the business model: they are all commodities, yet they require substantial capital investment in the setting up of a steel rolling mill for their production. This invention will transform the inherent "commodity" nature of the business into a "mass customization" business, capturing more values in the process. This invention will allow a rolling mill to produce Cut to Length steel bars in-line and at the same time substantially reduce end losses. It can be incorporated into any existing rolling mill with minimum additional investment.

BACKGROUND

Steel bars are supplied in "standard lengths" of 12 m, 15 m, or 18 m and in "standard bundle weights" of generally 2 ton bundles for the same size bars. In the case of concrete-reinforcing bars, they still have to be cut into shorter lengths according to the design of the building structure for a specific column, beam or floor slab. These short specific lengths are generally not designed to be multiples of any standard lengths and therefore will result in end losses when cut. Such cut-to-length operation is normally performed in a "Cut and Bend" yard, on or off the construction site. In a "Cut and Bend" operation, it is typical to expect a 5% loss in the steel bar ends, even with the best computer aided optimization programs. This 5% is very substantial in the building project, especially with the current high prices of steel bars.

The standard lengths of 12 m, 15 m and 18 m are selected to make maximum use of the size of the cargo holds of ships and trucks, while the standard bundle weight also serves for optimizing the capacity of the lifting apparatus of the ships and trucks.

There is an existing technology call "Flash Welding" of hot billets in which the tail end of a billet is welded to the front end of the next billet, in-line as they exit from the reheating furnace. Such operation will enable the rolling of bars continuously without any end; this is similar to "sequence casting" in a continuous casting machine. The primary objective of this process of endless rolling is to minimize the head and tail crops in the rolling mill and the short end losses at the cooling bed. In employing this flash welding process together with the very high accuracy of the modern flying shear before the cooling bed, one is able to achieve an accuracy of +50/−00 mm consistently for 120 m long bars on the cooling bed. This is about 0.05% end losses versus an industrial norm of 2.5%.

The flash welding process produces elevated temperature at each of the flash welded joints of the billet. Due to the temperature dependence of draft/spread characteristics, the joints, being at a higher temperature than the rest of the billet, will have more elongation than spread, resulting in "necking"-smaller cross sectional area than the nominal area in the finished product. This means that the area of the joint can fall below the minimum area specified by the Steel Standard. U.S. Pat. No. 6,929,167 B2 Pong et al. teaches a method which will eliminate such effect of such necking. In the actual operation, gauges were set up in the rolling line to monitor the dimension of the steel bars and the results show that this method is able to maintain a uniform cross section throughout the length of the bar including the flash welded joints.

With the use of flash-welding and uniform cross-section at the weld joints, "In-Line Cut to Length" steel bars are produced by the rolling mills with no loss of Steel bars are generally rolled from a 150 mm (6 inches) square billet of 12 meter (40 feet) length. These billets will be rolled into finished steel bars of various diameters from 50 mm (2 inches) to 10 mm ([⅜] inch). Because of the starting weight of the billet is finite, it will end up with various finished lengths of the steel bars of each diameter. The total lengths of the steel bars from each piece of billet will not be exact multiples of the normal finished bar length of 12 m (40 feet) and one will have end losses. This is usually 2.5%. With endless rolling as described above, the billet is welded end to end to form a continuous infinite piece and there will be no end losses.

In the specifications of steel bar standards BS4449 or ASTM 615, a size tolerance is permitted, provided it does not compromise the strength of the steel bar. Typically, BS4449 (2005) such allowable size tolerance is plus or minus 4.5%. The aim is to target at minus 3%, i.e. a lighter bar, but without affecting the strength of the bar at the nominal diameter. With single billet rolling, the minus 3% of the finished bar diameter will end up with a longer end piece by the same 3%. This will go to waste. With the endless rolling of welding the billets, the longer end piece will go into and become part of the next incoming piece and therefore this minus 3% is completely recovered as usable steel and is not waste.

For shipping or trucking reasons, such finished steel bars are usually cut to 12 m (40 feet), 15 m (50 feet), or 18 m (60 feet) lengths. Because of different lengths of columns, beams or slabs, the actual length requirement at the building site is never exactly 12 m, 15 m or 18 m. These bars have to be cut in a separate operation. A typical end loss of cutting to specific bar lengths is 5%.

An example of a cut to length steel bar production process and apparatus is known from US 2011-036137 A. This document describes a process of cutting a continuously rolled length of steel bar into successive segments, each representing a multiple of the length of the bar of a customer order, then cutting said segments first into two times the length of the bar of the customer order and then in half into lengths equal to the length of the bar of the customer order. The cut to length bars are then bundled for bars are then bundled for discharge from the rolling mill.

SUMMARY OF THE INVENTION

An object of the invention is to provide a method and apparatus for producing bundles of any arbitrary specific lengths of steel bars in line in a continuous rolling operation.

A further object of the invention is to enable such method and apparatus to continuously produce bundles of short lengths of steel bars which would normally require interruption of the continuous operation.

A particular object of the invention is to provide a method and apparatus which can produce cut to length short pieces according to a customer order, in line, without affecting rolling speed.

Viewed from one aspect, the present invention provides a method of producing steel bars that are cut to length in response to a customer order, said method comprising the steps of: producing a continuous length of steel bar from a rolling mill, cutting said continuous length of steel bar into lengths equal to the length of the bar of the customer order while maintaining the production of the continuous length of steel bar produced by the rolling mill, and bundling bars of the length of the customer order for discharge from the mill using one of two bundling stations arranged to receive and bundle cut bars.

The present inventor has recognised that as the length to which a continuously rolled steel bar is cut becomes shorter, the rate of production of individual bars to be bundled increases. However, there becomes a point, particularly where the desired length is shorter than the standard lengths, that a bottleneck is created by this increase in individual bar production. As a result, productivity can not be increased further and the continuous rolling, cut-to-length, bar production method is not usable to produce short bars without decreasing the rate of production of the continuous length of steel bar (which would lower the productivity of the mill). However, the provision in the present invention of multiple paths to process the cut to length bars by bundling them and discharging them from the rolling mill enables an increase in bar production and in production efficiency, and also enables the fast production of short, particularly shorter than the standard length, cut-to-length steel bars in a continuous rolling process.

Viewed from another aspect, the present invention provides apparatus for producing steel bars that are cut to length in response to a customer order, said apparatus comprising: a rolling mill for producing a continuous length of steel bar; shearing means coupled to a CPU configured to operate the shearing means to produce bars cut to the length of the customer order in time with the production of the continuously produced length of bar, and at least two bundling stations positioned to receive the cut bars from the cold shears for producing bundles of the bars of the length of the customer order.

The appended claims include dependent claims which define preferred embodiments of the above aspects of the invention.

The following detailed description details exemplary embodiments of the invention, with reference to the accompanying drawings.

DETAILED DESCRIPTION

Figure 1:
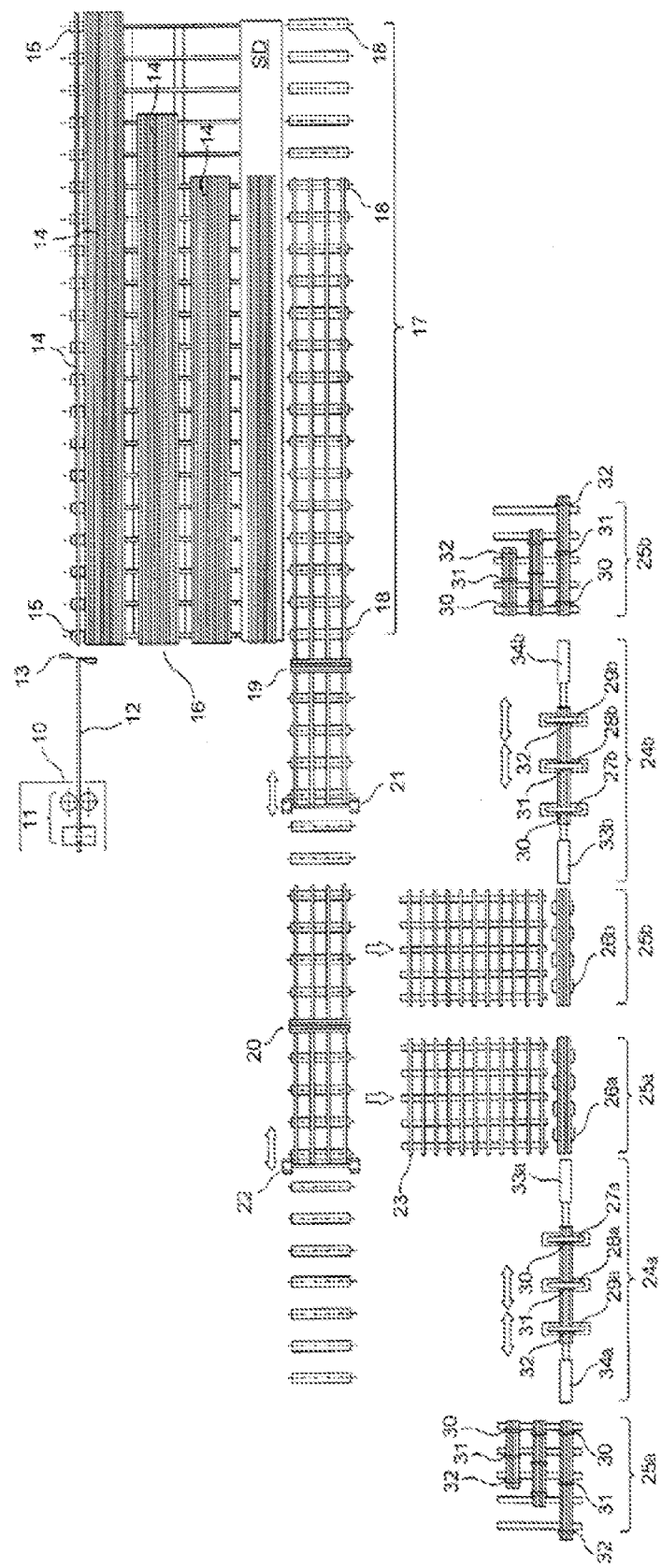
FIG. 1 is a diagrammatic illustration of a portion of a steel mill in which rolled bar is formed into cut to specific length bundles and bundled at two bundling stations.
Figure 2:
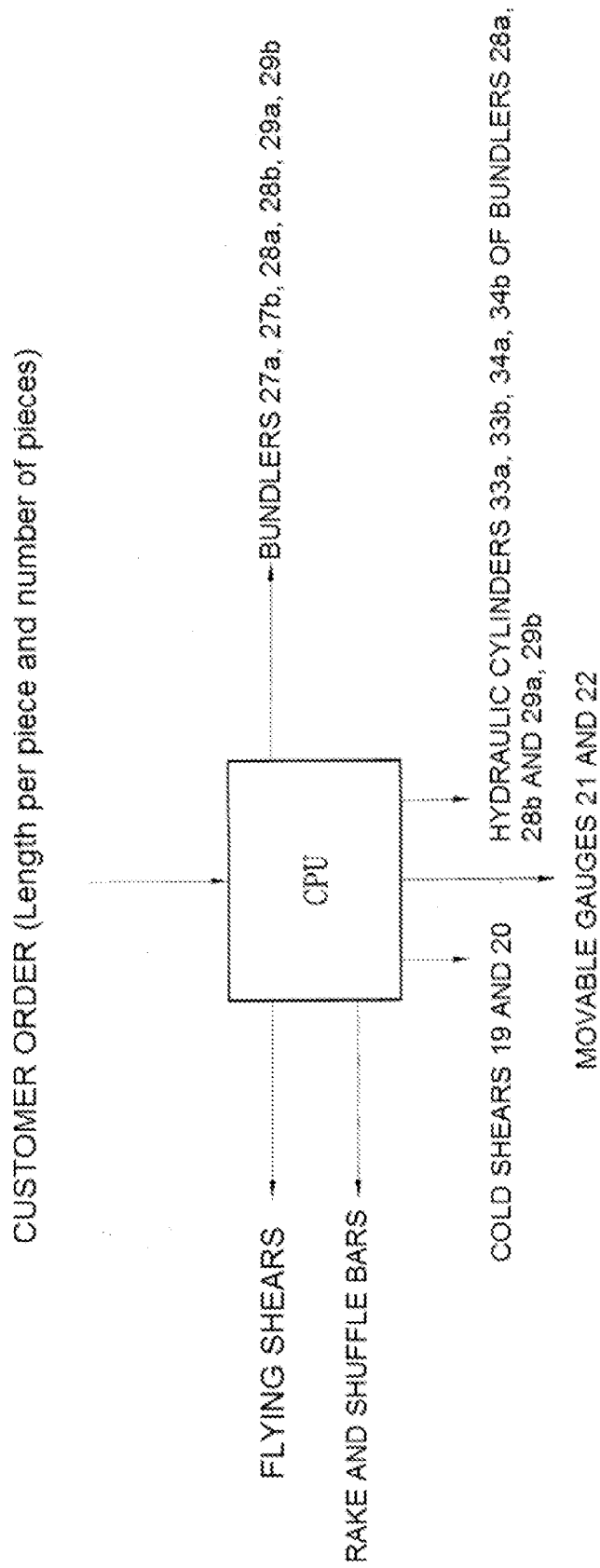
FIG. 2 diagrammatically shows a central processing unit (CPU) which controls operation to form the cut to length bundles.

In FIG. 1 there is shown the exit end 10 of a rolling mill 11 from which rolled bar 12 is continuously discharged at a determined high rate of speed. The rolled bar 12 has been rolled from continuous billet joined front to rear and has been hot rolled in the rolling mill. Downstream of the end 10 of the rolling mill is a flying shear 13 which is activated by a central processing unit (CPU) to cut the bar 12 on the fly and form a cut bar 14 of a given length which is deposited on the rollers 15 of a roller table 16.

As previously explained, current practice is limited to producing bars at the end of the mill of lengths of about 120 m as these are the optimum lengths which the current mill construction can be produced at the high rate of rolling speeds.

The invention permits producing specific arbitrary shorter lengths without reducing the production rate and in particular cutting the length of the bars to the customer order in correspondence to the length needed on the job thereby completely eliminating end cut waste on the job site as well as the need for production cutting at the job site. This will be explained more fully later. (The cut bar 14 is then displaced laterally into a notch in a cooling bed 16 to undergo cooling. The bar 14 is advanced stepwise, notch by notch until it reaches the last notch where it is now cooled and ready to be displaced laterally to a shuffle device SD where a given number of bars e.g. 10 or so are collected and formed in a layer of a batch of bars 14.

The construction and operation of the cooling bed and shuffle device is conventional and not described in detail.

The batch of bars 14 on the shuffle device are then moved sideways onto a roller table 17 disposed adjacent to the shuffle device SD. The roller table 17 has rollers 18 which are driven to advance the batch 14 of bars in reverse to the direction it was advanced on the roller table 17.

In order to keep up with the production rate and make the short cut-to-length cuts, two cold shears 19,20 and respective movable gauges 21, 22 are placed in sequence along the roller table 17 to cut the bars 14 into the desired lengths. The cold shears are massive in size to develop forces of 1000 tons or more and they are fixedly secured in a rigid foundation. The two cold shears are secured at a spacing of 20 meters to handle the largest contemplated cut-to-length size. Specifically, the bars 14 are moved to a stopped position controlled by the gauge 21 at which cold shears 19 is spaced at a distance from the end of the bars by an amount equal to twice the length of the desired cut-to-length piece. The cut pieces advance to the gauge 22 at which the cold shear 20 cuts the pieces in half to the final desired length. When both cold shears 19, 20 have cut the bars, there are pieces 23 equal to the desired cut length. The movable gauges 21, 22 permit adjustment of the position at which the cold shears cut the bars 14 to change the length of the pieces to be cut. By this double cut of the bars, the rate of production can be maintained. Also, when the length of the cut pieces is to be changed for a subsequent batch, the movable gauges are adjusted to correspond to the desired new length.

The cut to length pieces are next moved sideways via one of two rolling conveyors to be fed to one of two bundling stations 24a, 24b where the pieces 23 are bundled and made ready for shipment. The bars cut from a first side of cold shears 20 are fed to bundling station 24a, while the bars cut from a first side of cold shears 20 are fed to bundling station 24b.

Each of the bundling stations 24a, 24b includes a roller table 25a, 25b on which the cut pieces 23 are deposited. The pieces 23 advance into a conventional collector 26a, 26b where rollers are arranged in a predominantly circular array to collect the pieces in a circular bundle.

In order to tie the bundle of cut pieces when they are of short length i.e. of substantially less than 12 m e.g. 8 m or less, three spaced ties are needed. When the length of the short pieces is changed based on a new customer order, the spacing or pitch of the ties must be changed correspondingly. Furthermore, according to the invention, the tying operation is carried out in one stop to keep up with the mill speed. Generally, two end ties are made at a given distance from the ends of the bundle and a central tie is made midway there between. The collected pieces are fed into three spaced conventional bundlers 27a, 27b, 28a, 28b, 29a, 29b which tie the bundle of pieces at ties 30, 31, 32 at appropriate spaced locations. The ties 30, 31, and 32 are made simultaneously and the bundle is then advanced from the bundling station 24a, 24b via respective roller conveyors 25a, 25b to be discharged from the mill.

In accordance with the invention, the second and third bundlers 28a, 28b, 29a and 29b are movably supported so that they can be quickly adjusted to adjust the space when the length of the cut piece is changed. This enables a reduction in the travelling time of the cut bars needed as they move along in the bundling stations. The movable bundlers 28a, 28b, 29a, 29b are drivingly connected to respective hydraulic cylinders 33a, 33b, 34a, 34b which are connected to the CPU to control the position of the bundlers.

The bundling stations 24a, 24b operate simultaneously to bundle separate bundles of cut-to-length bars 23.

The invention makes it possible to be able to provide cut to specific short lengths required by the building site and recover all the losses associated with existing technology and at the same time, does not slow down the production of the mill.

A key component of the invention is the CPU which controls with the charging of the billets, the following elements.
a) flying shears 13
b) rake and shuffle bars
c) roller table 17
d) roller table 25
e) cold shears 19, 20
f) gauge stops 21, 22
g) bundlers 27a, 27b, 28a, 28b, 29a, 29b
h) hydraulic cylinders 33a, 33b, 34a, 34b Example The following Example will explain in detail the operation of the mill to obtain cut-to-length bars.

The weight of each billet is recorded as it is being charged into the reheat furnace. These charge weights will be compared with the end product weights to obtain material losses for that shift, which will primarily be oxidation losses. There will be minimal front end crop losses and no tail end crop losses because of the use of the flash welding process as explained previously.

The operator keys in the exact number and exact specific lengths as per the order of that particular size of bar being rolled for the command of the flying shear 13.

With conventional methods;

If one were to cut for an order of 6.4 m bar from a standard length of 12 m, one will end up with a 6.4 m bar and a short piece of 5.6 m.

If it were to cut from a standard length of 15 m, it will have two pieces of 6.4 m and a short piece of 2.2 m.

If it were to cut from a standard length of 18 m, it will have two pieces of 6.4 m with a short piece of 5.2 m.

These short lengths are usually kept on the side for another part of the building project which may require a length shorter than these end cuts, or they will be disposed of as scrap. All these options are undesirable.

With the invention, the operator will set in the programmable logic of the CPU sequence for the flying shears 13 to produce lengths of cut as multiples of the specific lengths of the final product. Assuming that a typical cooling bed is able to accept 120 m long bars, the programmable logic at the CPU will allow the operator to set the flying shear to cut lengths of 115.2 m, which is 18 multiples of 6.4 m. If the order is for 500 pieces of 6.4 m, the setting will be 27 cuts of 115.2 m with the last cut of 89.6 m, making a total length of 3,200 m or 500 pieces of 6.4 m.

A command signal to the cooling bed will move a double step after the last cut of 89.6 m to separate this batch from the next.

If the next order is for 5.2 m, the operator will input 109.2 m, which makes 21 pieces of 5.2 m to follow the previous 6.4 m batch. If this order of 5.2 m is, for example, 400 pieces, the number of cuts for 109.2 m, will be 18, with the last cut at 114.4 m. The total length of this order is 2,080 m making 400 pieces of 5.2 m finished length. Again a double step motion of the cooling bed will separate this new batch from the next. The same process will be repeated for any other specific lengths and quantities for the same size bar.

As each batch of bars leaves the cooling bed 16 by the raking motion and the shuffle bars the batch of bars will be side shuffled to roller table 17 in the conventional way. Each batch will be conveyed separately to the cold shears 19, 20 for final cutting to the ordered lengths. In this case, the first batch will be 115.2 m with the last piece 89.6 m, for a final cut length of 6.4 m and the second batch will be 109.2 m with the last piece 114.4 m, for the final cut length of 5.2 m. The cutting capacity of the cold shear will determine how many bars from the same batch length are presented for cutting each time. It is worth noting that since the tail end of each bar running to the cooling bed is being run in reverse direction to the cold shears, these tail ends having been cleanly cut by the flying shears 13 will not require head trimming by the cold shears. This contributes to additional material saving.

Two stationary in-line cold shears 19, 20 are utilized in order to keep up with the rolling capacity of the mill for the cutting of such short bars. Each cold shear will have its respective movable gauges stop 21, 22. In this example, the first a gauge stop 21, will be set for 12.8 m, which is 2*6.4 m, and the cut bars will move along to the next gauge stop 24 which has been set for 6.4 m and are cut to 6.4 m by the second cold shear. After completing each batch of specific lengths, the gauge stops 21, 22 will be moved automatically by a signal from the CPU to the next required length and locked. In this example, the first gauge stop 21 will move to 10.4 m, which is 2*5.2 m, while the second gauge stop 22 will move to 5.2 m.

Steel bars of each specific length will be collected separately and tied into bundles in bundle weights convenient for handling using one of two bundling stations 24a, 24b. Additional commands in the programmable logic of the CPU will be sent to the in-line bundlers 27a, 27b, 28a, 28b, 29a, 29b so that the ties will be made at the appropriate spaced positions along the length of the short bars. The second and third bundlers 28a, 28b, 29a, 29b are movable and the first bundler 27a, 27b is fixed so as to set the proper pitch for the ties and enable all ties to be made simultaneously and to reduce the travelling time required by the short bars having to move along in conventional bundling stations. The tied bundles leave respective bundling station 24a, 24b via respective rolling conveyors 25a, 25b. Each tied bundle is weighed and tagged with the appropriate bar code label specifying contract number, size, length, number of pieces and bending schedules.

In a separate operation, these bundles of specific length are transferred to a bending yard near the mill. This bending yard will make the necessary bending of each of the bars to a bending bar schedule. These cut and bend bars will then be ready to be delivered to the construction site for installation in the various beams or columns or slabs.

In total, the rolling operation of the invention should save as much as 10% of losses in conventional manufacture and be able to supply cut to length bars in a specific number to customers with no additional cost.

Although the invention has been described with reference to a disclosed embodiment, it will become apparent to those skilled in the art that numerous modifications and variations can be made within the scope of the invention as defined in the claims.

The invention claimed is:

1. A method of producing steel bars that are cut to length in response to a customer order, said method comprising the steps of:
   producing a continuous length of steel bar from a rolling mill in an endless bar rolling process, comprising: flash welding the tail end of a hot billet to the front end of the next billet, in-line as they exit from a reheating furnace to enable rolling of the continuous length of steel bar without any end,
   cutting said continuous length of steel bar into lengths equal to the length of the bar of the customer order while the length of bar is in motion and while maintaining the production of the continuous length of steel bar produced by the rolling, mill; and
   bundling bars of the length of the customer order for discharge from the mill by simultaneous operation of a plurality of bundling stations arranged to receive and bundle cut bars, wherein at least one of said bundling stations has a plurality of bundling machines, and wherein the bundling machine nearest the end of the bundling station at which the bars of the length of the customer order are input for bundling remains axially stationary independently of the length of the bars of the customer order, and further wherein at least one of the other bundling machines of the bundling station is axially moveable.

2. A method as claimed in claim 1, further comprising moving the axial position of the or each moveable bundling machine in response to a change in a length of the bars of the customer order.

3. A method as claimed in chum 1, wherein the bars of the length of the customer order are fed to the first and second bundling stations by respective first and second conveying, means, or removed from the first and second bundling machines by respective first and second conveying means, or both.

4. A method as claimed in claim 1, wherein cutting said continuous length of steel bar into lengths equal to the length of the bar of the customer order while maintaining the production of the continuous length of steel bar produced by the rolling mill comprises:
   cutting said continuous length of steel bar into successive segments, each representing a multiple of the length of the bar of the customer order, cutting said segments in in-line cold shears first into two times the length of the bar of the customer order and then in half into lengths equal to the length of the bar of the customer order.

5. A method as claimed in claim 4, wherein bars of length of the customer order located on a first side of said in-line cold shears after the last cut are conveyed to a first bundling station, and wherein bars of length of the customer order located on a second side of said in-line cold shears opposite side first side after the last cut are conveyed to a second bundling station.

6. A method as claimed in claim 1, wherein bundling bars of the length of the customer order for discharge from the mill comprises simultaneous operation of two bundling stations arranged to receive and bundle cut bars.

7. Apparatus for producing steel bars that are cut to length in response to a customer order, said apparatus comprising:
   a rolling mill for producing a continuous length of steel bar in an endless bar rolling process by flash welding the tail end of a hot billet to the front end of the next billet, in-line as they exit from a reheating furnace to enable rolling of the continuous length of steel bar without any end;
   shearing means coupled to a CPU configured to operate the shearing means, while the length of bar is in motion, to produce bars cut to the length of the customer order in time with the production of the continuously produced length of bar; and
   at least two bundling stations positioned to receive the cut bars from the cold shears for producing bundles of the bars of the length of the customer order, wherein at least one of said bundling stations has a plurality of bundling machines, and wherein the bundling machine nearest the end of the bundling station at which the bars of the length of the customer order are input for bundling remains axially stationary in use independently of the length of the bars of the customer order, and further wherein at least one of the other bundling machines of the bundling station is axially moveable.

8. Apparatus as claimed in claim 7, wherein the or each moveable bundling machine is connected to the CPU for being moved in response to a change in length of the bar of the customer order.

9. Apparatus as claimed in claim 7, further comprising first and second conveying means arranged to feed the bars of the length of the customer order to the first and second bundling stations respectively, or first and second conveying means arranged to remove the bars from the first and second bundling machines respectively, or both.

10. Apparatus as claimed in claim 7, comprising more than two bundling stations positioned to receive the cut bars from the cold shears for producing bundles of the bars of the length of the customer order.

11. Apparatus as claimed in claim 7, wherein the shearing means comprises:
   flying shear at an exit end of said rolling mill;
   said CPU connected to said flying shear to cut said continuous length of steel bar into lengths each representing a multiple of the length of the bar of the customer order,
   two in-line cold shears to which said lengths are continuously fed,
   said cold shears having respective adjustable gauge stops,
   said cold shears and said gauge stops being connected to said CPU which positions and operates said cold shears so that one cold shear cuts said lengths into pieces equal to two times the length of the bar of the customer order and the other cold shear cuts the cut pieces in half to produce bars cut to the length of the customer order.

12. Apparatus as claimed in claim 11, wherein the apparatus is configured such that bars of length of the customer order located on a first side of said in-line cold shears after the last cut are conveyed to a first bundling station, and wherein bars of length of the customer order located on a second side of said in-line cold shears opposite side first side after the last cut are conveyed to a second bundling station.

* * * * *